US008205094B2

(12) United States Patent
Dive-Reclus

(10) Patent No.: US 8,205,094 B2
(45) Date of Patent: Jun. 19, 2012

(54) TAMPER EVIDENT REMOVABLE MEDIA STORING EXECUTABLE CODE

(75) Inventor: Corinne Dive-Reclus, Herts (GB)

(73) Assignee: Nokia Corporation, Espoo (FI)

( * ) Notice: Subject to any disclaimer, the term of this patent is extended or adjusted under 35 U.S.C. 154(b) by 868 days.

(21) Appl. No.: 10/515,739

(22) PCT Filed: May 28, 2003

(86) PCT No.: PCT/GB03/02326
§ 371 (c)(1),
(2), (4) Date: Nov. 24, 2004

(87) PCT Pub. No.: WO03/100583
PCT Pub. Date: Dec. 4, 2003

(65) Prior Publication Data
US 2005/0216907 A1    Sep. 29, 2005

(30) Foreign Application Priority Data
May 28, 2002    (GB) .................................. 0212318.0

(51) Int. Cl.
*G06F 11/30* (2006.01)
*G06F 12/14* (2006.01)

(52) U.S. Cl. ............ 713/187; 713/2; 713/164; 713/165; 713/189; 726/27; 726/30; 717/168; 717/174; 717/177

(58) Field of Classification Search .................. 713/187, 713/189, 176, 2, 181, 152, 172; 717/168, 717/174; 726/26, 27, 2, 1, 14, 16; 718/1, 718/100
See application file for complete search history.

(56) References Cited

U.S. PATENT DOCUMENTS

| 4,975,950 | A | * | 12/1990 | Lentz ............................ 726/24 |
| 5,359,659 | A |   | 10/1994 | Rosenthal |
| 5,495,518 | A |   | 2/1996 | Hayashi |
| 5,572,590 | A |   | 11/1996 | Chess |
| 5,883,956 | A | * | 3/1999 | Le et al. ........................ 713/170 |
| 5,944,821 | A | * | 8/1999 | Angelo ............................ 726/22 |
| 5,954,817 | A | * | 9/1999 | Janssen et al. ................. 713/169 |
| 6,026,293 | A | * | 2/2000 | Osborn ........................ 455/411 |
| 6,085,299 | A | * | 7/2000 | Angelo et al. ................. 711/163 |
| 6,253,324 | B1 |   | 6/2001 | Field et al. .................... 713/187 |
| 6,438,600 | B1 | * | 8/2002 | Greenfield et al. ........... 709/229 |
| 6,463,535 | B1 | * | 10/2002 | Drews ........................... 713/176 |
| 6,567,917 | B1 | * | 5/2003 | Ziese ............................ 713/187 |
| 6,609,199 | B1 | * | 8/2003 | DeTreville .................... 713/172 |
| 6,615,404 | B1 | * | 9/2003 | Garfunkel et al. ............ 717/173 |
| 6,651,171 | B1 | * | 11/2003 | England et al. ............... 713/193 |
| 6,681,329 | B1 | * | 1/2004 | Fetkovich et al. ............ 713/189 |
| 6,707,915 | B1 | * | 3/2004 | Jobst et al. ..................... 380/247 |
| 6,754,548 | B1 |   | 6/2004 | Yoshii et al. |
| 6,782,477 | B2 | * | 8/2004 | McCarroll ..................... 713/189 |
| 6,802,006 | B1 | * | 10/2004 | Bodrov ......................... 713/187 |
| 6,880,083 | B1 | * | 4/2005 | Korn ............................. 713/170 |
| 6,892,301 | B1 | * | 5/2005 | Hansmann et al. ........... 713/172 |
| 7,003,672 | B2 | * | 2/2006 | Angelo et al. ................. 713/189 |
| 7,043,636 | B2 | * | 5/2006 | Smeets ......................... 713/170 |
| 7,055,029 | B2 | * | 5/2006 | Collins et al. ................. 713/161 |
| 7,092,911 | B2 |   | 8/2006 | Yokota et al. |
| 7,131,036 | B2 | * | 10/2006 | Wray et al. ..................... 714/38 |
| 7,201,662 | B2 | * | 4/2007 | LeMay et al. ................... 463/43 |
| 7,225,333 | B2 | * | 5/2007 | Peinado et al. ............... 713/164 |
| 7,275,160 | B2 | * | 9/2007 | Pearson et al. ................ 713/172 |
| 7,376,625 | B2 | * | 5/2008 | Koskela et al. ................. 705/57 |
| 7,437,563 | B2 | * | 10/2008 | Vaha-Sipila .................. 713/176 |
| 7,502,941 | B2 | * | 3/2009 | Michael et al. ............... 713/189 |
| 7,882,352 | B2 | * | 2/2011 | Dive-Reclus et al. ........ 713/164 |
| 2002/0002673 | A1 | * | 1/2002 | Narin ............................. 713/152 |
| 2002/0013910 | A1 | * | 1/2002 | Edery et al. ................... 713/201 |
| 2002/0023032 | A1 | * | 2/2002 | Pearson et al. ................. 705/35 |
| 2002/0026584 | A1 | * | 2/2002 | Skubic et al. ................. 713/180 |
| 2003/0005246 | A1 | * | 1/2003 | Peinado ........................ 711/163 |
| 2003/0009687 | A1 | * | 1/2003 | Ferchau et al. ............... 713/200 |
| 2003/0028807 | A1 | * | 2/2003 | Lawman et al. .............. 713/201 |
| 2003/0120943 | A1 | * | 6/2003 | Hughes ......................... 713/193 |
| 2003/0182561 | A1 | * | 9/2003 | Challener et al. ............. 713/189 |
| 2003/0216172 | A1 | * | 11/2003 | LeMay et al. ................... 463/29 |

(Continued)

FOREIGN PATENT DOCUMENTS
EP    0 754 999    1/1997

(Continued)

OTHER PUBLICATIONS

Asit Dan et al, ChakraVyuha (CV): A Sandbox Operating System Environment for Controlled Execution of Alien Code, pp. 1-22, IBM Research Report, 1997.*

(Continued)

*Primary Examiner* — Nasser Goodarzi
*Assistant Examiner* — Shanto M Abedin
(74) *Attorney, Agent, or Firm* — Alston & Bird LLP

(57) ABSTRACT

A mobile wireless device operable to install code on a removable medium, in which the device is programmed to calculate and store a digest of this code into a persistent non-removable store inside the device. When the removable medium is plugged back, and when the code is invoked, the device recalculates a digest from the code it wants to load from the removable medium and compares it with the one stored inside the persistent non-removable store. If they do not match, the code has been tampered with and therefore cannot be trusted by the device. The digest is accessible only by components in the Trusted Computing Base so is itself secure. The digest may be a hash or other unique and representative value.

14 Claims, No Drawings

U.S. PATENT DOCUMENTS

| | | | |
|---|---|---|---|
| 2003/0226040 A1* | 12/2003 | Challener et al. | 713/202 |
| 2004/0111618 A1* | 6/2004 | Vaha-Sipila | 713/176 |
| 2004/0199508 A1* | 10/2004 | Radatti | 707/8 |
| 2005/0091501 A1* | 4/2005 | Osthoff et al. | 713/181 |
| 2005/0166064 A1* | 7/2005 | Dive-Reclus et al. | 713/189 |
| 2005/0204127 A1* | 9/2005 | Dive-Reclus et al. | 713/152 |
| 2006/0053426 A1* | 3/2006 | Dive-Reclus et al. | 719/328 |

FOREIGN PATENT DOCUMENTS

| | | | |
|---|---|---|---|
| EP | 0813133 A2 * | 12/1997 | |
| EP | 1 041 573 | 10/2000 | |
| EP | 1 041 573 A2 | 10/2000 | |
| EP | 1 081 577 | 3/2001 | |
| EP | 1 081 577 A2 | 3/2001 | |
| EP | 1 168 172 | 1/2002 | |
| GB | 2 330 031 | 4/1999 | |
| JP | 2001 067794 A | 3/2001 | |
| JP | 2001-067794 A | 3/2001 | |
| JP | 2001 075868 A | 3/2001 | |
| JP | 2001-075868 A | 3/2001 | |
| JP | 2001-147898 | 5/2001 | |
| JP | 2001-147898 A | 5/2001 | |
| JP | 2002-023704 | 1/2002 | |
| JP | 2002-023704 A | 1/2002 | |
| JP | 2002 023704 A | 1/2002 | |
| WO | WO 00/18162 * | 3/2000 | |
| WO | WO 01/05155 | 1/2001 | |
| WO | WO 01/05155 A1 | 1/2001 | |
| WO | WO 02/33525 | 4/2002 | |

OTHER PUBLICATIONS

Arto Kettula, Security Comparison of Mobile OSes, pp. 1-14, Helsinki University of Technology, 2000.*

Li Gong, On Security in Capability-Based Systems, pp. 56-60, 1998.*

Jonathan T. Moore, Mobile Code Security Techniques, pp. 1-10, Technical Reports (CIS), 1998.*

Search Report, dated Nov. 15, 2003, issued in related UK Application No. GB0312199.3.

International Search Report for Application No. PCT/GB03/02326 dated Oct. 7, 2003.

Office Action for Japanese Application No. 2004-507971 dated Dec. 28, 2009.

Office Action for Japanese Application No. 2010-057097 dated Dec. 5, 2011.

* cited by examiner

TAMPER EVIDENT REMOVABLE MEDIA STORING EXECUTABLE CODE

CROSS REFERENCE TO RELATED APPLICATIONS

This application claims the priority of PCT/GB03/02326 filed May 28, 2003and British Application GB 0212318.0 filed on May 28, 2002, the contents of which are hereby incorporated by reference.

FIELD OF THE INVENTION

This invention relates to an apparatus providing tamper evidence for executable code stored on removable media. This apparatus forms an element in a platform security architecture.

DESCRIPTION OF THE PRIOR ART

Platform security covers the philosophy, architecture and implementation of platform defence mechanisms against malicious or badly written code. These defence mechanisms prevent such code from causing harm. Malicious code generally has two components: a payload mechanism that does the damage and a propagation mechanism to help it spread. They are usually classified as follows:
  Trojan horse: poses as a legitimate application that appears benign and attractive to the user.
  Worm: can replicate and spread without further manual action by their perpetrators or users.
  Virus: Infiltrates legitimate programs and alters or destroys data.

Security threats encompass (a) a potential breach of confidentiality, integrity or availability of services or data in the value chain and integrity of services and (b) compromise of service function. Threats are classified into the following categories:
1. Threats to confidentiality and integrity of data. Examples: Get user's password; corrupt files.
2. Threats to confidentiality and integrity of services. Examples: Use bandwidth from phone network subscriber without paying for it; repudiate transaction with network service provider.
3. Threats to availability of service (also called denial of service). Examples: Prevent the user from sending a text message; prevent the user from accepting a telephone call.

Hence, mobile wireless devices offer very considerable challenges to the designer of a platform security architecture. One critical aspect of this challenge is that mobile wireless devices will regularly install programs on removable storage devices. The main motivation is to provide extra storage that the wireless device user can change, based on which set of programs he/she wishes to use. A well-known example is the usage of floppy diskettes or memory cards in personal computer environments. The removable storage device might, in principle, be tampered with in some way when not plugged into the mobile wireless device and the programs stored on the device would hence lose their integrity. It is vital that, in all circumstances, a wireless device is confident in the integrity of executable code, including when a removable storage device is to be re-inserted (e.g. that no malicious alterations to override security features have been made and no viruses introduced etc).

To date, there have however been no efficient proposals for ensuring the integrity of executable code which has been transferred off from a mobile wireless device and is being returned to the original device.

SUMMARY OF THE PRESENT INVENTION

In a first aspect of the present invention, there is a mobile wireless device operable to install native executable code on a removable medium, in which the device is programmed to calculate and store a digest (a digest is a value generated from the full content of the code using an algorithm guaranteeing that the same value cannot be regenerated if the content has changed) of this code into a persistent non-removable store inside the device. Native code is composed of instructions directly executed by a CPU on a device.

When the removable medium is plugged back, and when the executable is invoked, the device recalculates a digest from the code it wants to load from the removable medium and compares it with the one stored inside the persistent non-removable store. If they do not match, the executable has been tampered with and therefore cannot be trusted by the device. The digest is accessible only by components in the Trusted Computing Base (see later) so is itself secure. The digest may be a hash or other unique and representative value that can be recomputed from the entire executable.

This approach differs from conventional watermarking, in which a hash is derived from a media file and then inserted back into the file, modifying it imperceptibly.

In one implementation, the digest as well as the executable's 'capability' are securely stored on the device. A 'capability' can be thought of as an access token that corresponds to a permission to undertake a sensitive action. (The purpose of the capability model is to control access to sensitive system resources.) At load time, the loader verifies the hash before loading. If the verification fails, the executable will not be loaded. If the executable is unknown (no associated digest), the executable is loaded with no capability (i.e no access rights to sensitive resources) and no identity (no access rights to data that is private to an identified operating system process). If the verification succeeds, then the executable is loaded and the stored capability assigned to the newly loaded code.

The present invention allows users to share memory cards and other forms of removable medium between devices without restriction. It also allows each user to keep the privileges he/she has granted to applications stored on these cards independent from the medium and other users' choices.

DETAILED DESCRIPTION

The present invention will be described with reference to the security architecture of the Symbian OS object oriented operating system, designed for single user wireless devices. The Symbian OS operating system has been developed for mobile wireless devices by Symbian Ltd, of London United Kingdom. defences. In a similar fashion, it employs simple and staggered layers of security above and beyond the installation perimeter. The key threats that the model is trying to address are those that are linked with unauthorised access to user data and to system services, in particular the phone stack. The phone stack is especially important in the context of a smart phone because it will be controlling a permanent data connection to the phone network. There are two key design drivers lying behind the model:
  Firewall protection of key system resources through the use of capability-based access control.
  Data partitioning which creates a protected part of the file system which standard software is not able to access.

The main concept of the capability model described below is to control what a process can do rather than what a user can do. This approach is quite different to well-known operating systems as Windows NT and Unix. The main reasons are:

The very nature of Symbian OS is to be mono-user.

Symbian OS provides services through independent server processes. They always run and are not attached to a user session. As long as power is supplied, Symbian OS is always on even if no user is logged on.

Symbian OS is aimed to be used in devices used by a large public with no technology knowledge. When installing software, the user may not have the skills to decide what permissions to grant to an application. Furthermore, with always-connected devices, the consequences of a wrong or malevolent decision may impact a domain much larger than the device itself.

1 Trusted Computing Platform

1.1 Trusted Computing Base

A trusted computing base (TCB) is a basic architectural requirement for robust platform security. The trusted computing base consists of a number of architectural elements that cannot be subverted and that guarantee the integrity of the device. It is important to keep this base as small as possible and to apply the principle of least privilege to ensure system servers and applications do not have to be given privileges they do not need to function. On closed devices, the TCB consists of the kernel, loader and file server; on open devices the software installer is also required. All these processes are system-wide trusted and have therefore full access to the device. This trusted core would run with a "root" capability not available to other platform code (see section 2.1).

There is one other important element to maintain the integrity of the trusted computing base that is outside the scope of the present invention, namely the hardware. In particular, with devices that hold trusted computing base functionality in flash ROM, it is necessary to provide a secure boot loader to ensure that it is not possible to subvert the trusted computing base with a malicious ROM image.

1.2 Trusted Computing Environment

Beyond the core, other system components would be granted restricted orthogonal system capability and would constitute the Trusted Computing Environment (TCE); they would include system servers such as socket, phone and window servers. For instance the window server would not be granted the capability of phone stack access and the phone server would not be granted the capability of direct access to keyboard events. It is strongly recommended to give as few system capabilities as possible to a software component to limit potential damage by any misuse of these privileges.

The TCB ensures the integrity of the full system as each element of the TCE ensures the integrity of one service. The TCE cannot exist without a TCB but the TCB can exist by itself to guarantee a safe "sand box" for each process.

2 Process Capabilities

A capability can be thought of as an access token that corresponds to a permission to undertake a sensitive action. The purpose of the capability model is to control access to sensitive system resources. The most important resource that requires access control is the kernel executive itself and a system capability (see section 2.1) is required by a client to access certain functionality through the kernel API. All other resources reside in user-side servers accessed via IPC [Inter Process Communication]. A small set of basic capabilities would be defined to police specific client actions on the servers. For example, possession of a make calls capability would allow a client to use the phone server. It would be the responsibility of the corresponding server to police client access to the resources that the capability represents. Capabilities would also be associated with each library (DLL) and program (EXE) and combined by the loader at run time to produce net process capabilities that would be held by the kernel. For open devices, third party software would be assigned capabilities either during software installation based on the certificate used to sign their installation packages or post software installation by the user,. The policing of capabilities would be managed between the loader, the kernel and affected servers but would be kernel-mediated through the IPC mechanism.

The key features of the process capability model are:

It is primarily focused around system servers and client-server IPC interactions between these entities.

Capabilities are associated with processes and not threads. Threads in the same process share the same address space and memory access permissions. This means that any data being used by one thread can be read and modified by all other threads in the same process.

The policing of the capabilities is managed by the loader and kernel and through capability policing at the target servers. The kernel IPC mechanism is involved in the latter.

When the code is not running, capabilities are stored inside of libraries and programs. Capabilities stored in libraries and programs are not modifiable, as they would be stored during installation in a location that is only accessible by the Trusted Computing Base.

Not all servers would have to handle client capabilities. Servers would be responsible for interpreting capabilities as they wish.

The only cryptography involved in this scheme might be at the software installation stage where certificates would be checked off against a suitable root certificate.

2.1 System capabilities: Protecting the Integrity of the Device

Root. "Full Access to all Files—Can Modify Capabilities Associated with Executables"

"Root" capability—Used by the Trusted Computing Base only, it gives full access to all files in the device.

System Capabilities

Some system servers require some specific access to the Trusted Computing Base. Because of the object-oriented implementation of Symbian OS, the kind of resources required by a system server is most of the time exclusive to it. Therefore, one system server would be granted some system capability that would be orthogonal to those required by another. For instance, the window server would be granted access to keyboard and pen events issued by the kernel but it would not have permission to access the phone stack. In the same way, the phone server would be granted access to the phone stack but would not have permission to collect events from the kernel.

As examples, we can name:

| | |
|---|---|
| WriteSystemData | Allows modification of configuration system data |
| CommDD | Grants access to all communication and Ethernet card device drivers. |
| DiskAdmin | Can perform administration task on the disk (reformat, rename a drive, . . . ). |

2.2 User-Exposed Capabilities: Mapping Real-World Permissions

The process of generating capabilities can be difficult. One has first to identify those accesses that require policing and then to map those requirements into something that is meaningful for a user. In addition, more capabilities means greater complexity and complexity is widely recognised as being the chief enemy of security. A solution based on capabilities should therefore seek to minimise the overall number deployed. The following capabilities map fairly broadly onto the main threats which are unauthorised access to system services (eg. the phone stack) and preserving the confidentiality/integrity of user data.

PhoneNetwork. "Can access phone network services and potentially spend user money"
    "Make telephone calls"
    "Send short text messages".

WriteUserData. "Can read and modify users private information"
    "Add a contact".
    "Delete an appointment".

ReadUserData. "Can read users private information"
    "Access contacts data".
    "Access agenda data".

LocalNetwork. "Can access local network"
    "Send Bluetooth messages".
    "Establish an IR connection"
    "Establish an USB connection"

Location. "Can access the current location of the device"
    "Locate the device on a map"
    "Display closest restaurants and cinema"

Root and system capabilities are mandatory; if not granted to an executable, the user of the device cannot decide to do it. Their strict control ensures the integrity of the Trusted Computing Platform. However the way servers check user-exposed capabilities or interpret them may be fully flexible and even user-discretionary.

2.3 Assigning Capabilities to a Process

The association of a run-time capability with a process involves the loader. In essence, it transforms the static capability settings associated with individual libraries and programs into a run-time capability that the kernel holds and can be queried through a kernel user library API. The loader applies the following rules:

Rule 1. When creating a process from a program, the loader assigns the same set of capabilities as its program's.

Rule 2. When loading a library within an executable, the library capability set must be greater than or equal to the capability set of the loading executable. If not true, the library is not loaded into the executable.

Rule 3. An executable can load a library with higher capabilities, but does not gain capabilities by doing so.

Rule 4. The loader refuses to load any executable not in the data caged part of the file system reserved to the TCB.

It has to be noted that:

Libraries' capabilities are checked at load time only. Beyond that, all code contained in libraries is run freely and is assigned the same capability set as the program it runs into when initiating some IPC calls.

For ROM images with execution in place, the ROM build tool resolves all symbols doing the same task as the loader at runtime. Therefore the ROM build tool must enforce the same rules as the loader when building a ROM image.

These rules

Prevent malware from being loaded in sensitive processes, for example, a plug-in in a system server Encourage encapsulation of sensitive code inside processes with no possible bypass The examples below show how these rules are applied in the cases of statically and dynamically loaded libraries respectively.

2.3.1 Examples for Linked DLLs

The program P.EXE is linked to the library L1.DLL.
The library L1.DLL is linked to the library L0.DLL.

Case 1:
    P.EXE holds Cap1 & Cap2
    L1.DLL holds Cap1 & Cap2 & Cap3
    L0.DLL holds Cap1 & Cap2.
    Process P cannot be created, the loader fails it because L1.DLL cannot load L0.DLL. Since L0.DLL does not have a capability set greater than or equal to L1.DLL, Rule 2 applies.

Case 2:
    P.EXE holds Cap1 & Cap2
    L1.DLL holds Cap1 & Cap2 & Cap3
    L0.DLL holds Cap1 & Cap2 & Cap3 & Cap4
    Process P is created, the loader succeeds it and the new process is assigned Cap1 & Cap2. The capability of the new process is determined by applying Rule 1; L1.DLL cannot acquire the Cap4 capability held by L0.DLL, and P1.EXE cannot acquire the Cap3 capability held by L1.DLL as defined by Rule 3.

2.3.2 Examples for Dynamically Loaded DLLs

The program P.EXE dynamically loads the library L1.DLL.
The library L1.DLL then dynamically loads the library L0.DLL.

Case 1:
    P.EXE holds Cap1 & Cap2
    L1.DLL holds Cap1 & Cap2 & Cap3
    L0.DLL holds Cap1 & Cap2
    Process P is successfully created and assigned Cap1 & Cap2.
    When P requests the loader to load L1.DLL & L0.DLL, the loader succeeds it because P can load L1.DLL and L0.DLL. Rule 2 does apply here the loading executable being the process P not the library L1.DLL: the IPC load request that the loader processes is sent by the process P. The fact that the call is within L1.DLL is here irrelevant. Rule 1 & 3 apply as before and P does not acquire Cap3 by loading L1.DLL Case 2:
    P.EXE holds Cap1 & Cap2
    L1.DLL holds Cap1 & Cap2 & Cap3
    L0.DLL holds Cap1 & Cap2 & Cap4
    Process P is successfully created and assigned Cap1 & Cap2. When P requests the loader to load L1.DLL & L0.DLL, the loader succeeds it because P can load L1.DLL and L0.DLL. Once again, Rule 2 does apply with P as the loading executable rather than L1.DLL, while Rule 3 ensures P acquires neither Cap3 nor Cap4.

2.4 How to Combine the Flexibility of Removable Media with Platform Security 2.4.1 Today 2.4.1.1 Device Integrity Today, files stored on removable media are completely unprotected. They are fully accessible and can be modified. When a removable medium is plugged back in the device, no checks are performed to ensure the integrity of the system. Risks associated with this fact may be seen as low because possession of the medium is needed for subversion. However a malicious user may install malware and damage not her device but use it as a weapon against network operators, for instance. Today without platform security, the only protection is to implement a loader that refuses to load code from removable media. However in the long term, more memory space will be required to store more applications and this strategy will prevent users buying software for their device and potentially might discourage them to buy open platforms if they could not take advantage of it.

2.4.1.2 Data Confidentiality

Threats on data confidentiality ate real but limited only to data contained on the stolen removable medium. Most of the threats can be already prevented without the support of platform security:

1. Hardware control access to the medium
   Even off the device, the medium is password-protected; for instance Secure MMC, PIN-protected SIM, etc.
2. File encryption
   If a user is concerned about the security of some sensitive data and wants to store it on a removable medium, he/she may encrypt it.
3. File system encryption
   File system encryption may be provided at disk device driver level.

2.4.2 Proposed Invention

The proposed invention aims not only to prevent current threats but also to keep the interoperability and code distribution uses of removable media.

No platform security architecture can prevent the modification of removable media when off the wireless device. Even with a password-protected removable medium, an authorised user can alter it. Therefore, the best Platform Security can provide is a tamper evidence mechanism for known executables and a secure execution of unknown code 2.4.2.1 Software Installer At install time, when an application package has to be stored on a removable medium:

Step 1. The software installer verifies that executables to be installed on removable media have got a correct secure identifier (SID) and have not impersonated another legitimate executable to access to its private data.

Step 2 The software installer assigns some system and user capabilities to executables included in the application package.

Step 3. The software installer hashes the executables.

Step 4. The software installer stores all capabilities and the hash (i.e. digest) in a TCB-restricted area of a permanent file system (e.g. that cannot be removed).

At de-install time, the software installer removes the executables from the removable medium if present and destroys the associated file created at installation step 4

For preformatted removable media (files already installed), a lighter version of the application package must be provided too in order to let the Software Installer perform steps 1 to 3. The present invention does not specify any apparatus for detecting new applications on pre-formatted removable media; a possible option may be to detect the presence of new applications at the time of insertion of the removable medium in the wireless device and to consider the removal of a pre-formatted removable medium as the de-installation of applications it contains.

2.4.2.2 Loader

At load time, the loader identifies an executable to load from a removable medium. It looks at the corresponding HASH file: the hash in a TCB-restricted area of a permanent file system (e.g. that cannot be removed).

If it exists, it hashes the executable and compares both hashes.

If identical, the loader assigns system and user capabilities extracted from the HASH file to the executable and performs the standard loading process.

If not, the loader returns an error.

If no corresponding HASH file exists, the loader assigns no system and user capability to the executable and performs the standard loading process. It also assigns the secure identifier (SID) (the SID (secure identifier) of a process is a way of uniquely identifying a piece of code capable of running on the OS and is stored in the related executable) to 'unknown' to prevent impersonation of a legitimate process. As no capability and no SID are granted to unknown code, this one cannot compromise the integrity of the Trusted Computing Platform.

The hashing process must be independent of the removable medium. What has to be achieved is to authenticate a piece of code, not the removable medium it comes from. The preferred implementation uses SHA-1 as it is reasonably secure and fast for use in a wireless device.

2.4.3 Use Cases 2.4.3.1 Actors

1. U an user.
2. P1, P2 two wireless devices owned by U.
3. C1, C2 two removable media owned by U.
4. APP an application with only one executable.
5. Loader
6. SWInstall, the software installer
7. ETEL the process controlling access to the phone network.

2.4.3.2 Assumptions

1. APP is delivered as a signed application package APP.sis with PhoneNetwork capability.
2. C: is the internal drive
3. D: is a removable medium drive.
4. C1 contains APP.sis under root. APP.sis is the installation package of APP.

2.4.3.3 Use Case 1—U Installs APP on P1.

1. U plugs C1 into P1.
2. U uses P1.
3. U asks SWInstall to install D:APP.sis on drive D:\.
4. SWInstall verifies the signing certificate. {E1}
5. SWInstall extracts APP.app.
6. SWInstall removes system and user capabilities from the executable and copies them to a to c:\<directory accessible to TCB only>\APP.cap.
7. SWInstall hashes APP.app and stores it in c:\<directory accessible to TCB only>\APP.cap.
8. SWInstall copies APP.app to D:
9. SWInstall completes the installation.
   E1-Invalid signature
1. End of the use case.

2.4.3.4 Use Case 2—U copies C1 into C2 off line and uses C2 with P1.

1. U copies C1 into C2 offline.
2. U plugs C2 in P1.
3. U uses P1.
4. U asks Loader to start APP.
5. Loader finds APP.app in D:\
6. Loader opens c:\<directory accessible to TCB only>\APP.cap.
7. Loader verifies hashes successfully. {E2}
8. Loader extracts system and user capabilities from APP.cap
9. Loader loads APP.app and assigns capabilities to APP.app.
10. U asks APP to dial a number.
11. APP asks ETEL to dial a number
12. ETEL successfully checks APP has got PhoneNetwork.
13. ETEL dials the number.
14. U uses the phone connection.

E2—Hashes mismatch
1. Loader does not load APP and returns Binary Hash Mismatch error.
2. U cannot use APP.

2.4.3.5 Use Case 3—U uses C1 with P2
1. U plugs C1 in P2.
2. U uses P2.
3. U asks Loader to start APP.
4. Loader finds APP.app in D:
5. Loader does not find c:\<directory accessible to TCB only>\APP.cap.
6. Loader loads APP.app and assigns no user and system capabilities to APP.app
7. U asks APP to dial a number.
8. APP asks ETEL to dial a number
9. ETEL detects APP has not got PhoneNetwork.
10. ETEL asks U if she wants to make the call.
11. U accepts. {E1}
12. ETEL dials the number.
13. U uses the phone connection.
E1-U does not accepts
1. ETEL does not dial the number.
2. APP displays an error to U.

2.4.3.6 Use Case 4—U Installs APP on P2 and Demotes APP's PhoneNetwork
1. U plugs C1 in P2.
2. U uses P2.
3. U successfully installs APP on P2 D:\(refer to Use case 1)
4. U asks SWInstall to remove PhoneNetwork from APP's capabilities.
5. SWInstall modifies c:\<directory accessible to TCB only>\APP.cap and reset user capabilities in the file.
6. U asks Loader to start APP.
7. Loader finds APP.app in D:\
8. Loader opens c:\<directory accessible to TCB only>\APP.cap.
9. Loader verifies hashes successfully. {E2}
10. Loader extracts capabilities from APP.cap
11. Loader loads APP.app and assigns capabilities to APP.app.
12. U asks APP to dial a number.
13. APP asks ETEL to dial a number
14. ETEL detects APP has not got PhoneNetwork.
15. ETEL asks U if she wants to make the call.
16. U accepts. {E1}
17. ETEL dials the number.
18. U uses the phone connection.
19. U plugs C1 on P1.
20. U asks APP to dial a number.
21. APP asks ETEL to dial a number
22. ETEL successfully checks APP has got PhoneNetwork.
23. ETEL dials the number.
24. U uses the phone connection.
E1—U does not accepts
1. ETEL does not dial the number.
2. APP displays an error to U.
E2—Hashes mismatch
1. Loader does not load APP and returns Binary Hash Mismatch error.
2. U cannot use APP.

2.4.3.7 Use Case 5—U Uninstalls APP from P2 with C2
1. U plugs C2 in P2.
2. U uses P2.
3. U asks SWInstall to uninstall APP.
4. SWInstall deletes c:\<directory accessible to TCB only>\APP.cap.
5. SWInstall asks U to confirm deletion on D:.
6. U confirms. {E1}
7. SWInstall deletes APP.app from D:.
8. U cannot use C2 on P1 or P2 to start APP.
E2—U does not confirm
1. SWInstall does not delete APP.app on D.
2. U can still use C2 with P1 to start APP.

2.4.3.8 Use Case 6—U Hackes APP.app to Add Some System Capability.
1. U modifies APP.app system capabilities off line on C1.
2. U plugs C1 in P1.
3. U uses P1.
4. U asks Loader to start APP.
5. Loader finds APP.app in D:
6. Loader opens c:\<directory accessible to TCB only>\APP.cap.
7. Loader does not verify the hash successfully.
8. Loader does not load APP and returns Binary Hash Mismatch error.
9. U cannot use APP.

2.4.3.9 Conclusion
These use cases show that even with Platform Security, the flexibility provided by removable media is kept:
To share cards between devices with different user capability settings.
To duplicate cards and use the copies without restriction.
To securely execute code from removable media.

The invention claimed is:
1. An apparatus comprising a persistent non-removable store and a processor, wherein the processor is configured to cause the apparatus to at least:
install executable code onto a removable storage medium coupled to the apparatus so as to enable execution of the executable code by the processor;
calculate and cause storage of a digest of the executable code in the persistent non-removable store, wherein the digest as well as capabilities of the executable code are securely stored on the apparatus;
determine that the removable storage medium has been recoupled to the apparatus to reload the executable code onto the apparatus subsequent to the removable storage medium having been decoupled from the apparatus; and
in response to the determination:
calculate a new digest of the executable code stored on the removable storage medium,
compare the calculated new digest with the digest stored in the persistent non-removable store, and
prevent use of the executable code being reloaded from the removable storage medium in an instance in which the new digest and the stored digest differ.
2. The apparatus of claim 1 in which the stored digest is accessible only by components in a trusted computing base.
3. The apparatus of claim 1, wherein in an instance in which no comparison is possible because the executable is unknown, the processor is configured to cause the apparatus to load the executable without any capabilities and identity.
4. The apparatus of claim 1, wherein in an instance in which the calculated digest and the stored digest differ, the processor is configured to cause the apparatus to not load the executable.
5. The apparatus of claim 1, wherein in an instance in which the calculated digest and the stored digest do not differ, the processor is configured to cause the apparatus to load the executable and assign the executable capabilities securely stored on the device.
6. The apparatus of claim 1, wherein the removable storage medium comprises a memory card.

7. The apparatus of claim 1, wherein the apparatus comprises a mobile wireless apparatus.

8. A method comprising:
- installing executable code onto a removable storage medium coupled to a mobile device;
- calculating and causing storage of a first digest of the executable code in a persistent non-removable store of the mobile device, wherein the first digest as well as capabilities of the executable code are securely stored on the mobile device;
- determining that the removable storage medium has been recoupled to the mobile device to enable the executable code to be reloaded subsequent to the removable storage medium having been decoupled from the mobile device; and
- in response to the determination:
- calculating a new digest of the executable code stored on the removable storage medium;
- comparing, by a processor, the new digest with the first digest; and
- preventing use of the executable code in an instance in which the new digest and the first digest differ.

9. The method of claim 8 in which the first digest is accessible only by components in a trusted computing base.

10. The method of claim 8, wherein in an instance in which no comparison is possible because the executable is unknown, the executable code is loaded without any capabilities and identity.

11. The method of claim 8, wherein in an instance in which the new digest and the first digest differ, the executable code is not loaded.

12. The method of claim 8, wherein in an instance in which the new digest and the first digest do not differ, the executable code is loaded and assigned capabilities securely stored on the mobile device.

13. The method of claim 8, wherein the removable storage medium comprises a memory card.

14. A computer program product comprising at least one non-transitory computer readable storage medium having computer-readable program instructions stored therein, the computer-readable program instructions comprising:
- program instructions configured to install executable code onto a removable storage medium coupled to a mobile device;
- program instructions configured to calculate and cause storage of a first digest of the executable code in a persistent non-removable store inside the mobile device, wherein the first digest as well as capabilities of the executable code are securely stored on the mobile device;
- program instructions configured to determine that the removable storage medium has been recoupled to the mobile device to enable the executable code to be reloaded subsequent to the removable storage medium having been decoupled from the mobile device; and
- program instructions configured, in response to the determination, to:
- calculate a new digest of the executable code stored on the removable medium;
- compare the new digest with the first digest; and
- prevent use of the executable code in an instance in which the new digest and the first digest differ.

* * * * *

UNITED STATES PATENT AND TRADEMARK OFFICE
CERTIFICATE OF CORRECTION

PATENT NO.        : 8,205,094 B2
APPLICATION NO.   : 10/515739
DATED             : June 19, 2012
INVENTOR(S)       : Dive-Reclus Page 1 of 1

It is certified that error appears in the above-identified patent and that said Letters Patent is hereby corrected as shown below:

In the Specifications

Column 1, line 8, "May 28, 2003and" should read --May 28, 2003 and--.

Column 2, line 55, please delete "defences." and please add --The basic outline of the Symbian OS security architecture is analogous to a medieval castle's defences.--.

Signed and Sealed this
Seventh Day of May, 2013

Teresa Stanek Rea
*Acting Director of the United States Patent and Trademark Office*